United States Patent

[11] 3,570,674

| [72] | Inventor | Francis E. Dahlem |
| | | Louisville, Ky. |
| [21] | Appl. No. | 866,229 |
| [22] | Filed | Oct. 14, 1969 |
| [45] | Patented | Mar. 16, 1971 |
| [73] | Assignee | American Air Filter Company, Inc. |
| | | Jefferson County, Ky. |

[54] LIQUID FILTER APPARATUS
4 Claims, 7 Drawing Figs.

| [52] | U.S. Cl. | 210/400 |
| [51] | Int. Cl. | B01d 33/04 |
| [50] | Field of Search | 210/400 |

[56] References Cited
UNITED STATES PATENTS
3,288,296  11/1966  Hiw.......................... 210/400X Primary Examiner—Reuben Friedman
Assistant Examiner—T.A. Granger
Attorney—Ralph B. Brick ABSTRACT: A liquid filter assembly disposable in a liquid tank comprising an endless filter screen mounted by support members on a conveyor belt means, the endless filter screen being provided with an overlap expansion arrangement to permit expansion of the filter screen with expansion of the conveyor belt means, the expansion arrangement having tensioning and restraining means mounted to the conveyor belt means and cooperating therewith to restrain the free portion of the filter screen means from falling off its support members.

PATENTED MAR 16 1971 3,570,674

INVENTOR
FRANCIS E. DAHLEM

BY Ralph C. Buck
ATTORNEY

LIQUID FILTER APPARATUS

BACKGROUND OF THE INVENTION

The present invention relates to a liquid filter of the type which employs an endless filter screen wherein the endless screen is provided with an overlap expansion arrangement to permit expansion of the screen with expansion of the conveyor belt means. The present invention has particular applicability to an apparatus such as that disclosed in assignee's U.S. Pat. No. 3,464,563, issued to Francis E. Dahlem, et al., on Sept. 2, 1969.

SUMMARY OF THE INVENTION

In accordance with the present invention, an improved overlapping filter screen expansion arrangement is provided which not only permits expansion of the filter screen with expansion of the conveyor belt means, but further insures that the filter screen means is held in a tensioned and restrained manner as it travels along through a liquid bath, insuring that the mesh of the screen is maintained in open position for filtering purposes and at the same time insuring that the screen is effectively maintained in proper operating position along the entire length of the conveyor belt means in an efficient, straightforward and economical manner with a minimum of wear.

Various other features of the present invention will become obvious to one skilled in the art upon reading the disclosure set forth hereinafter.

More particularly, the present invention provides a liquid filter assembly for removing contaminant particulates from liquids in a liquid tank comprising: longitudinally extending spaced opposed wall members; opposed conveyor belt means mounted on each of the wall members in endless looped fashion; drive means connected to the conveyor belt means to drive the same, a plurality of spaced screen support members mounted to the opposed conveyor belt means; flexible filter screen means including leading edge, body and trailing edge portions mounted in looped fashion about the spaced screen support members with the leading edge portion of the filter screen means being fastened to one of the support members, the body portion resting in free fashion on successive support members, and the trailing edge portion overlapping an immediately successive leading edge portion to permit expansion of the filter screen means with expansion of the conveyor belt means; and tensioning and restraining means mounted to the conveyor belt means to restrain the free portion of the filter screen means from falling off the support members and hold the filter screen means in tension during filtering operations.

It is to be understood that various changes can be made in the arrangement, form and construction of the apparatus disclosed herein without departing from the scope or spirit of the present invention.

BRIEF DESCRIPTION OF THE DRAWINGS

Referring to the drawings which disclose one advantageous embodiment of the present invention.

Figure 1:
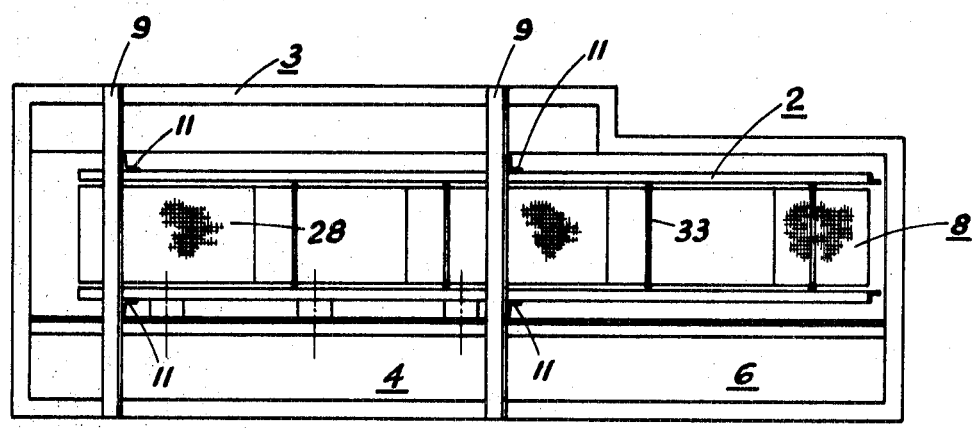
FIG. 1 is a schematic top plan view of the novel liquid filter assembly of the present invention incorporated in a liquid tank adapted to receive contaminant liquids to be treated.
Figure 2:
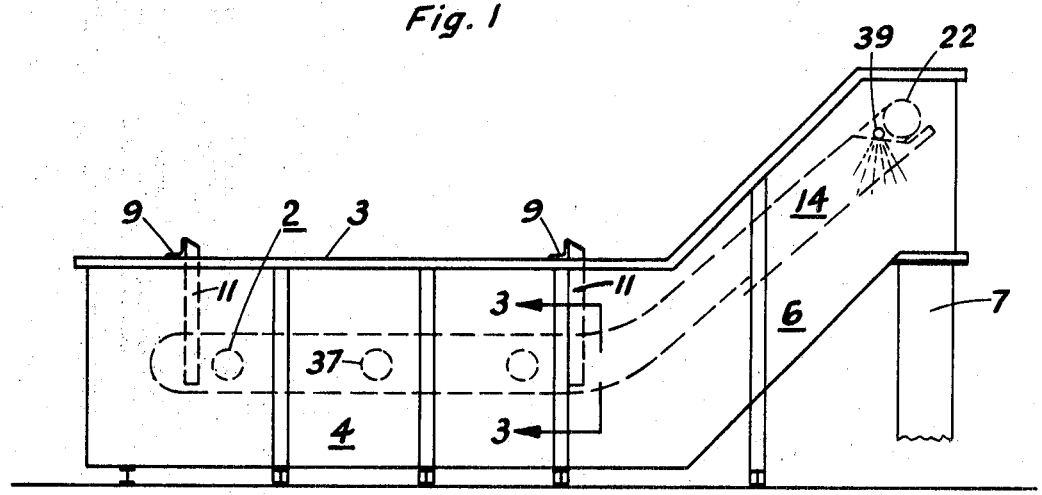
Figure 6:
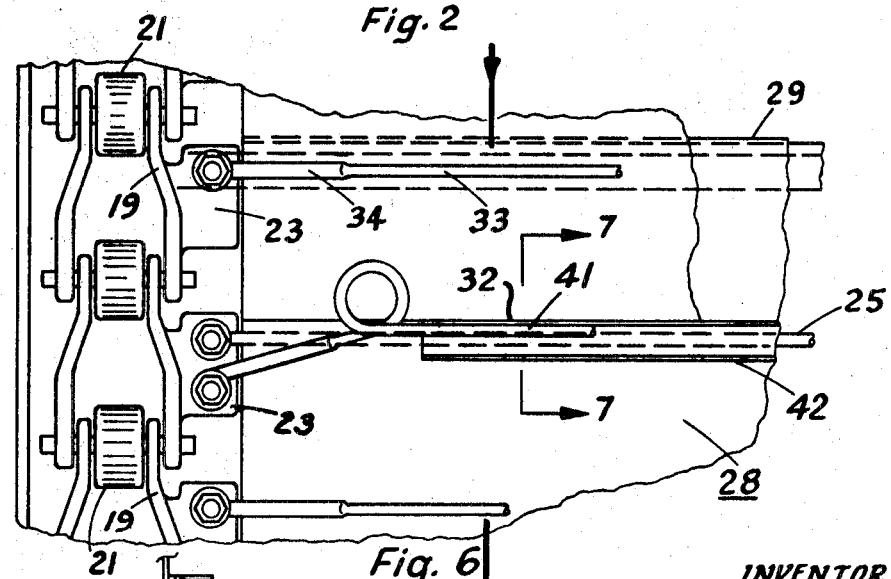
Figure 7:
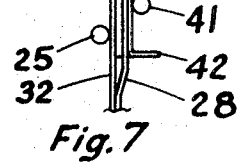
Figure 3:
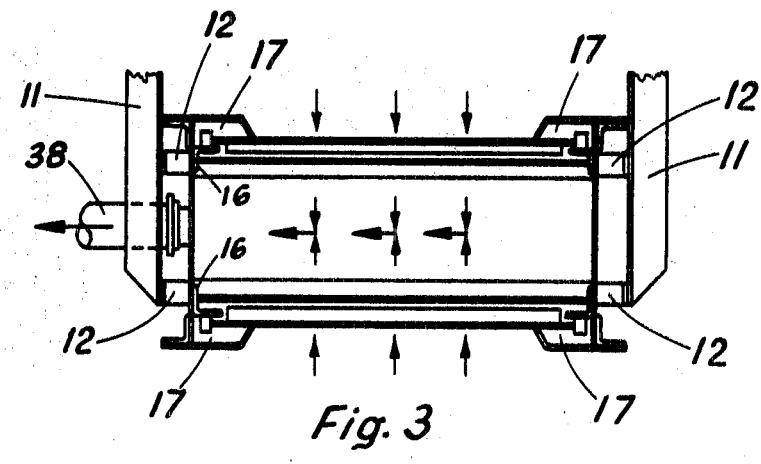
Figure 4:
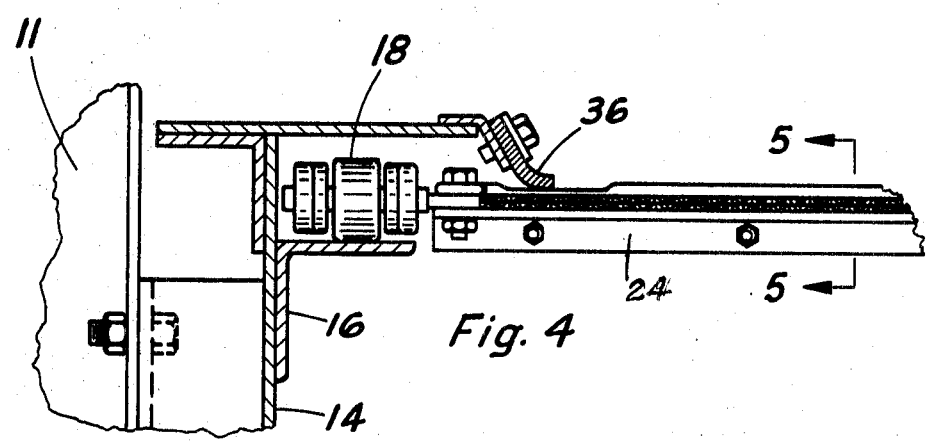
Figure 5:
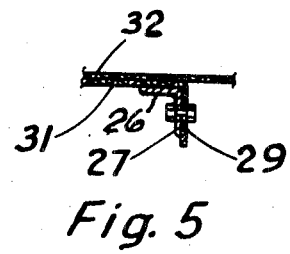

fig. FIG. is a side elevational view of the apparatus of FIG. 1;

FIG. 3 is a cross-sectional view taken in a plane passing through line 3-3 of FIG. 2 disclosing the liquid filter assembly suspended in a liquid tank;

FIG. 4 is an enlarged cross-sectional view of a portion of the apparatus of FIG. 3, disclosing in detail the sealing arrangement for the endless filter screen;

FIG. 5 is a cross-sectional view taken in a plane passing through line 5-5 of FIG. 4;

FIG. 6 is an enlarged top plan view of a portion of the apparatus of FIGS. 1 and 2 disclosing the details of the overlapping filter screen arrangement including the novel tensioning and restraining device; and, FIG. 7 is a cross-sectional view taken in a plane through line 7-7 of FIG. 6 showing the manner in which the tensioning and restraining means engage with a U-shaped bracket mounted on the filter screen.

Referring to FIGS. 1, 2 and 3 of the drawings, the novel liquid filter assembly 2 is shown disposed in liquid filter tank 3, the walls of tank 3 being contoured to include a liquid treating section 4 and a contaminant removal section 6. Contaminant removal section 6 is provided with a contaminant outlet conduit 7 to which contaminant particulates separated by endless screen filter 8 of filter assembly 2 are passed. Filter assembly 2 is suspended from tank 3 by means of suitable cross bars 9 and vertical suspension beams 11. The bars 9 are arranged to extend transversely across the open top of tank 3 and the suspension beams are each fastened at one end to the bars 9 and at the other end by means of suitable structural members 12 to one of the spaced opposed sidewall members of the filter assembly 2.

Sidewall members 14 of filter assembly 2 are arranged to be spaced from the sidewalls of tank 3 and above the bottom floor of such tank. The sidewalls 14 are contoured in accordance with the contour of the tank so that one portion of assembly 2 extends into the treating section 4 of the tank 3 to be below a preselected liquid level of the tank during filter treating operations, and the other portion extends into the contaminant removal section 6 of the tank with the end extremity adjacent and above contaminant outlet 7.

Provided along the inner facing of each of spaced walls 14 (FIG. 4) by means of appropriately positioning and contoured right-angle structural members 16 fastened to such inner wall face are looped guide channels 17. The looped guide channels 17 which include upper and lower flights connected by end turnaround sections serve to accommodate opposed spaced conveyor belts 18. Each conveyor belt 18 is comprised of a series of connected link members 19, the link members in turn being provided with rollers 21 which ride in looped guide channels 17, (FIGS. 4 and 6). As can be seen in FIG. 2 of the drawings, a suitable sprocket shaft 22 connected to a drive motor (not shown) can engage with the links of the spaced conveyor belts 18 to move them in an endless path above the looped guide channel 17. Each of links 19 is provided with an inwardly directed shelf member 23 along the inner side thereof. Referring to FIGS. 4 and 6 of the drawings, it can be seen that a plurality of spaced right-angle bars 24 are arranged to transversely extend between sidewall members 14 with the opposite ends thereof mounted to opposed shelf members 23 of opposed links by suitable nut and bolt arrangements as disclosed in the advantageous embodiment of the drawings. It is to be noted that right-angle bars 24 are provided between every other pair of opposed links 19. A plurality of rods 25 are alternately arranged with the right-angle bars 24 with their opposite ends connected in similar fashion by suitable nut and bolt arrangements to opposed shelf members 23 of alternate opposed link pairs. It is to be understood that if desired, right-angle bars 24 can be disposed between each of the successive pairs of link members — or in some other preselected arrangement in alternation with the support bars 25 — all in accordance with the dimension of the overall assembly and the weight of the screens to be supported. It will be noted that each of right-angle bars 24 is provided with a face leg 26 which lies in the planes of travel of the conveyor belt and an inturned leg 27 which extends normal to face leg 26 (FIG. 5).

The filter screen 8 in a manner similar to that as set forth in U.S. Pat. No. 3,464,563 is made up of a plurality of successive flexible filter screen sections 28 which are mounted in looped fashion about the spaced right-angle bars 24 and rods 25. Each of filter screen sections 28 includes a leading edge portion 29, a body portion 31, and a trailing edge portion 32, with the leading edge portion of each screen 28 being turned at right angles to fasten to an inturned leg 27 of one of the right-angle bars 24 (FIG. 5) by means of a suitable fastening arrangement — such as nut and bolts or rivets. The body portions 31 of each of screen sections 28 rests freely on successive face legs 26 of successive bars 24 and alternately rods 25 with the trailing edge portions of the screens being arranged to overlap with the leading edge portions 29 of immediately successive filter screen sections (FIGS. 5 and 6) to permit relative movement of the filter screen sections 28 with expansion of the conveyor belt 18. It is to be understood that, if the filter screen is of short length, only one flat section need to used, such section being arranged in a loop with the opposed ends thereof in overlapping fashion and the leading edge only fastened to a bar 24. It is further to be understood that the length of the sections can vary in accordance with the weight of the mesh and the overall weight and length of the filter belt needed — the particular extent of overlap of course being sufficient to accommodate the anticipated wear of the belt. As also is set forth in U.S. Pat. No. 3,464,563, to restrain the body portion of filter screen sections 28 to keep the free portions 31 and 32 of the filter sections from falling off the support members as the endless conveyor belt turns around the end of the guide channel 17 as it passes from an upper flight to a lower flight and vice versa, a plurality of spaced restraining rods 33 can be provided. These rods 33 extend transversely between sidewall members 14 in coextensive fashion with right-angle bars 24 so as to be immediately above the right-angle bars in spaced relation therewith with the opposite ends of the rods mounted to the opposed conveyor belt means in similar fashion as the bars so as to restrain the free portions of the filter screens. It is to be noted that the bars 33 are provided with flat sections 34 at the opposite ends thereof, these flat sections 34 being engaged by the edge of sealing strip members 36 to minimize the amount of leakage.

As can be seen in FIGS. 6 and 7 of the drawings and in accordance with the present invention, in addition to restraining rods 33 — or in place thereof when the screen sections 28 are short-looped spring rod members 41 are provided. Each spring rod 41 has its free ends mounted to opposed shelf members 23 of links 19 of conveyor belts 18. The intermediate portion of each rod 41 extends over the trailing end 32 of a screen section. Fastened to the trailing end 32 of each section is a longitudinally extending channel bar 42 of U-shaped cross section. Bar 42 extends transverse the screen between the conveyor belts. The intermediate portion of loop-shaped spring rod member 41 is arranged to nest in the channel of the U-shaped member to engage against one leg thereof to thus hold the free end of the screen in tension, stretching the screen taut from its fastened-down leading edge portion 29.

With such an arrangement, the meshes of the screen are insured to be maintained constantly in open position and, at the same time, the trailing edge portion of the screen is restrained on its supports during filtering operations to avoid undesirable wear. With the meshes open, the cleaning of contaminants from the filter screen is enhanced, a suitable spray conduit 39 being provided about the lower flight of the filter screen adjacent the contaminant outlet 7 in the liquid filter assembly to accomplish this.

Referring to FIGS. 2 and 3, it can be seen that suitable liquid outlets 37 communicate with the clean liquid plenum, clean liquid conduits 38 being provided to carry off the clean liquid for suitable use elsewhere, such as with spray conduit 39.

I claim:

1. A liquid filter assembly for removing contaminant particulates from liquids in a liquid tank comprising: longitudinally extending spaced opposed wall members; opposed conveyor belt means mounted on each of the said wall members in endless loop fashion; drive means connected to said conveyor belt means to drive the same; a plurality of spaced screen support members mounted to said opposed conveyor belt means; flexible filter screen means including leading edge, body and trailing edge portions mounted in looped fashion about said spaced screen support members with said leading edge portions of said filter screen means being fastened to one of said support members, the body portion resting in free fashion on successive support members, and the trailing edge portion overlapping an immediately successive leading edge portion to permit expansion of said filter screen means with expansion of said conveyor belt means; and tensioning and restraining means mounted to said conveyor belt means to restrain said free portion of said filter screen means from falling off said support means and hold said filter screen means in tension.

2. The apparatus of claim 1, said tensioning and restraining means including spring rod members mounted to the conveyor belt means, with an extending portion thereof cooperating with said trailing edge portion of said filter screen means to hold the same in tension.

3. The apparatus of claim 2, said trailing edge portion of said filter screen means having a bracket fixed thereto with said extending portion in cooperative relationship therewith.

4. The apparatus of claim 3, said bracket being of U-shaped cross section and extending transversely above said screen means between said opposed conveyor belt means with said extending portion of said spring rod member nesting therein.